(12) United States Patent
Okayama

(10) Patent No.: US 6,229,943 B1
(45) Date of Patent: May 8, 2001

(54) OPTICAL CIRCUIT DEVICE AND WAVELENGTH ROUTER

(75) Inventor: Hideaki Okayama, Minato-ku (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/034,288

(22) Filed: Mar. 4, 1998

(30) Foreign Application Priority Data

Apr. 28, 1997 (JP) .................................................. 9-110995
Apr. 30, 1997 (JP) .................................................. 9-113079

(51) Int. Cl.$^7$ ...................................................... G02B 6/26
(52) U.S. Cl. ............................... 385/39; 385/24; 385/37; 385/46; 385/14; 385/43
(58) Field of Search ................................ 385/39–50, 14, 385/37, 24

(56) References Cited

U.S. PATENT DOCUMENTS

| | | | |
|---|---|---|---|
| 5,388,001 | 2/1995 | Okayama et al. | 385/11 |
| 5,677,971 | 10/1997 | Okayame et al. | 359/629 |
| 5,841,919 | * 11/1998 | Akiba et al. | 385/37 |
| 5,909,522 | * 6/1999 | Shirasaki et al. | 385/27 |

FOREIGN PATENT DOCUMENTS 6-194539   7/1994  (JP) .

OTHER PUBLICATIONS

"Grating Spectograph in InGaAsP/InP for Dense Wavelength Division Multiplexing", Applied Physics Letters vol. 59, pp. 627–629, Aug. 1991.

"Phased Array Based WDM Devices", Proc. 21st Eur. Conf. on Opt. Comm., '95 Preliminary Draft, pp. 195–202, Sep. 1995.

"New Focusing and Dispersive Planar Component Based on an Optical Phased Array", Electronics Letters vol. 24, No. 7, pp. 385–386, Mar. 31, 1988.

"Phased–Array–Based Photonic Integrated Circuits for Wavelength Division Multiplexing Applications", IEICE Trans. Electron., vol. E80–C, No. 5, May 5, 1997.

* cited by examiner

Primary Examiner—Rodney Bovernick
Assistant Examiner—Ellen E. Kim
(74) Attorney, Agent, or Firm—Wenderoth, Lind & Ponack, L.L.P.

(57) ABSTRACT

A wavelength router has a structure capable of preventing a wavelength shift from occurring and an optical circuit device capable of reducing a phase error. The wavelength router includes three input ports; three input waveguides each having one end connected to the corresponding input ports, respectively; a first plane waveguide to which other ends of the input waveguides are connected; three output ports; three output waveguides each having one end connected to the corresponding output ports, respectively; a second plane waveguide to which other ends of the output ports are connected; and five interconnecting waveguides for connecting an output end face of the first plane waveguide and an input end face of the second plane waveguide. To make lengths of the interconnecting waveguides equal, optical path lengths from connection portions (end face) into which light signals are input to coupling parts between the first plane waveguide and the interconnecting waveguides, respectively, differ from one another.

7 Claims, 7 Drawing Sheets

FIG.3(A)
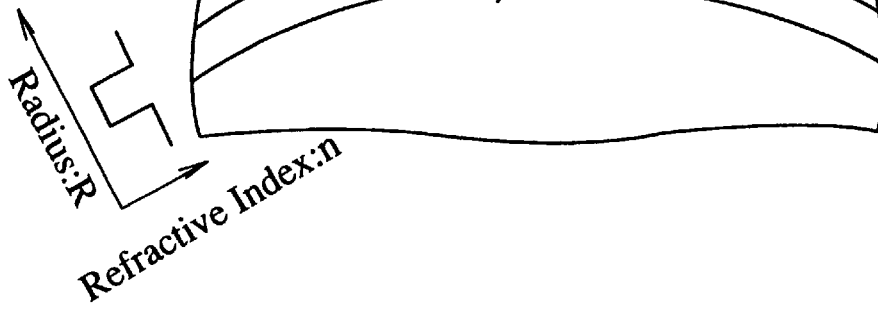
FIG.3(B)
FIG.3(C)
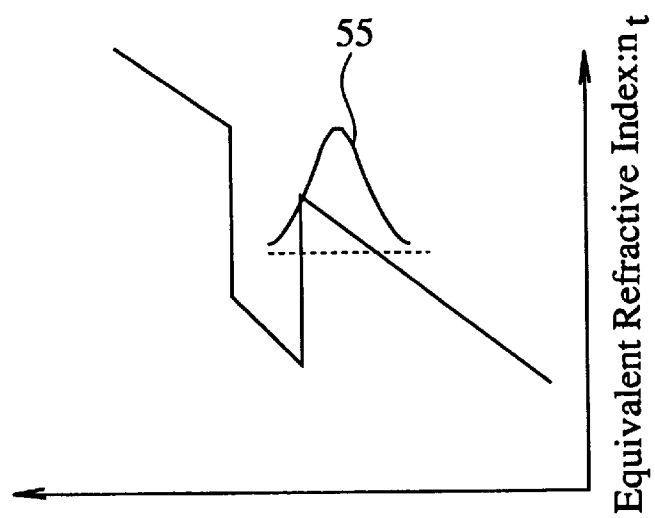

OPTICAL CIRCUIT DEVICE AND WAVELENGTH ROUTER

BACKGROUND OF THE INVENTION

1. Field of the Invention

The present invention relates to a wavelength router for a separating a light signal having multiple wavelengths to each light signal having its wavelength, and to an optical circuit device (or element) for controlling equiphases of a waveguide light, the device being suitable for use of the wavelength router.

2. Description of the Related Art

A diffraction grating acts as an optical waveguide multiplexing/demultiplexing element or device that has excellent wavelength separation characteristics. The device is also called as a wavelength (de-)multiplexer. Conventionally, there has been proposed a wavelength (de-)multiplexer using diffraction gratings (Reference 1: "Applied Physics Letters Vol. 59, pp. 627–629, August, 1991). The device is a plane waveguide having formed at one end face thereof a diffraction grating structure and having input/output ports provided at the other end face thereof. However, the one-sided input/output port is provided in the device and has n inputs and n outputs (where n is a natural number). Therefore, it is difficult to split or to distribute a plurality of input light signals to a plurality of output ports and therefore the device is difficult to use as a wavelength router.

There has also been proposed an n inputs/n outputs type wavelength router (Reference 2: "Proc. 21 Eur. Conf. on Opt. Comm. '95 Preliminary Draft pp. 195–202, September, 1995). The device has a curved waveguide-array or a plurality of arrayed waveguides as a set of interconnecting waveguides. The arranged waveguides have different lengths, respectively, and are provided between an input-side star coupler and an output-side star coupler. The lights passing through the different arrayed waveguides have different phases, respectively. These lights are incident upon the output-side star coupler and interfere with each other therein. Based on the wavelength dependency of these interference patterns, a light wave is separated to two or more light waves according to wavelengths. The former (de-)multiplexer, using a diffraction grating, utilizes the optical path length difference within the plane waveguide, whereas the latter (de-)multiplexer utilizes the optical path length difference among the respective arrayed waveguides.

However, the wavelength router disclosed in Reference 2 utilizes the difference in optical path lengths of the arrayed waveguides, as mentioned above. Due to this, the wavelength router has a disadvantage in that only a slight error of the waveguide widths of the arrayed waveguide causes a shift in wavelength more easily than the diffraction grating type device.

Meanwhile, there has been further proposed a circuit device for controlling the equiphase-front of waveguided light. The circuits are used as a wavelength router. For example, Reference 3 (Electronics Letters, Vol. 24, pp. 385–386, 1988) discloses the device of this type. The optical circuit device disclosed in Reference 3 comprises an array of curved waveguides having different curvatures and different lengths (see FIG. 1 in Reference 3).

Each of those curved waveguides has a width of 3 mm (line 3, page 386 in Reference 3) and a ridge shape. The device disclosed in Reference 3 controls phases of waveguided light using the difference in the optical path lengths of the curved waveguides. The optical circuit device of this type can be used as various functional devices such as a multiplexer, a demultiplexer and a wavelength filter.

However, in case of the above-stated prior art, if the difference in refractive index between curved waveguides and a substrate, or the widths of the curved waveguides vary, the equivalent refractive index of the curved waveguides vary. In case of Reference 3, for example, the curved waveguides are so narrow, that processing irregularity in waveguide widths is caused and, therefore, a variation in equivalent refractive index of the waveguides tends to occur. The change of the equivalent index of the waveguides causes an error in the phase difference intended to be given by the waveguides. The error is to be referred to as a 'phase error' hereinafter. This makes it difficult to control phases as required.

To avoid this problem, there has been proposed a technique disclosed in, for example, Reference 4 or Japanese Unexamined Patent Publication No. 6-194539.

Reference 4 discloses an array of curved waveguides having both ends to which straight waveguides are connected, respectively (see, for example, FIG. 1 in Reference 4). In this technique, as in the case of the above prior art, the arrayed waveguides have different lengths, respectively. Owing to this, it is possible to give predetermined different phases to waveguided lights in the respective waveguides (lines 27–30, column 5, page 4 in Reference 4). However, a fundamental mode light is propagated in the vicinity of the outer edges of the curved waveguides (lines 6–7 from the bottom, column 4, page 3 in Reference 4). The propagation constant is not therefore dependent on the widths of the waveguides (line 5 from the bottom, column 4, page 3 in Reference 4). Therefore, it is possible to prevent a phase error due to a variation in the widths of the curved waveguides.

Even with the technique of Reference 4, a phase error resulting from, for example, the irregularity in the width of the straight waveguides cannot be avoided. In addition, since the curved waveguides have different curvatures (that is, different radiuses), they have different equivalent reflective indexes (which will be described in detail later in comparison with the present invention with reference to FIG. 1). As a result, a phase error eventually occurs.

Therefore, an object of the present invention is to provide an optical circuit device comprising a phase control unit capable of effectively preventing phase errors compared with the conventional techniques.

Another object of the present invention is to provide wavelength router designed not to easily cause a shift in wavelength.

SUMMARY OF THE INVENTION

In consideration of the above, according to the first aspect of the present invention, a wavelength router comprises a plurality of input ports for inputting light signals; a plurality of input waveguides each having one end connected to a corresponding input port, respectively; a first plane waveguide to which the other end of each input waveguide is connected; a plurality of output ports for outputting the light signals; a plurality of output waveguides each having one end connected to a corresponding output ports, respectively; a second plane waveguide to which the other end of each output port is connected; a plurality of interconnecting waveguides for connecting an output end face of the first plane waveguide and an input end face of the second plane waveguide. To give different phases to the light signals, optical path lengths of a plurality of light propagation paths from a first connecting part, between the input waveguides and the first plane waveguide, respectively, to second coupling parts, between the interconnecting waveguides and the second plane waveguide, respectively, differ from one another. In addition, lengths of the interconnecting waveguides are made equal, and optical path lengths of a plurality of light propagation paths from the first connection parts, respectively, to first coupling parts, between the first plane waveguide and the interconnecting waveguides, respectively, differ from one another.

Light signals incident on the first plane waveguide from the input waveguides through the first connection parts are diffused into many directions. The diffused light signals reach many positions on the output end face through light propagation paths within the first plane waveguide, respectively. One end of each of a plurality of interconnecting waveguides is coupled to predetermined positions on the output end face, respectively. The wavelength router according to the present invention has a structure in which light signals incident from the input waveguides and reaching the respective interconnecting waveguides are propagated through optical paths having different lengths. Therefore, the light signals propagated within the first plane waveguide and reaching the different interconnecting waveguides have phases different from one another. This makes it possible to obtain desired functions without making lengths of the interconnecting waveguides different as in the case of the conventional case. Additionally, this makes it possible to obtain a structure capable of preventing a wavelength shift resulting from width formation errors of the interconnecting waveguides since a phase difference is not given by the interconnecting waveguides.

In the wavelength router according to the present invention, an i-th optical path length from a first connection part to a first coupling part between the first plane waveguide and an i-th interconnecting waveguide (where i is an integer) is defined as $Lr_i$, and an (i+1)-th optical path length from the first connection part to a first coupling part between the first plane waveguide and an (i+1)-th interconnecting waveguide adjacent to the i-th interconnecting waveguide is defined as $Lr_{i+1}$. In this case, it is preferable that the i-th and (i+1)-th optical path lengths are set such that a difference $(Lr_{i+1} - Lr_i)$ between the i-th and (i+1)-th optical path lengths is constant. With such a structure, it is possible to give predetermined different phases to light signals incident on the adjacent interconnecting waveguides on the output end face of the first plane waveguide.

In the wavelength router according to the present invention, it is further preferable that the output end face is of a diffraction grating structure. It is also preferable that one end of each of the interconnecting waveguides are connected to stepped gratings provided at the diffraction grating structure, respectively.

By so doing, optical path lengths of light propagation paths from the first connection parts between the input waveguides and the first plane waveguide to the output end face of the first plane waveguide can be made different according to positions to which one end of each of the interconnecting waveguides are coupled.

In the wavelength router according to the present invention, it is preferable that the output end face and one end of each of the interconnecting waveguides are coupled through a taper structure. To carry out the wavelength router according to the present invention, it is preferable that the taper structure has a shape of an unfolded fan from the one end of each of the interconnecting waveguides to the output end face.

With such a structure, it is possible to make diameters of one end of each of the interconnecting waveguides connected to the output end face of the first plane waveguide larger than usual. Therefore, the ratio at which the light signals propagated through the first plane waveguide are incident on the respective interconnecting waveguides, is increased. Thus, light signals can be effectively converged into the respective interconnecting waveguides. As a result, even if the optical path lengths from the first connection parts between the input waveguide and the first plane waveguide to the coupling parts between the interconnecting waveguides and the first plane waveguide are relatively long, it is possible to prevent the quantity of light of the light signals incident on the interconnecting waveguides from decreasing.

According to the second aspect of the present invention, in an optical circuit device having a phase control unit for controlling phases of waveguided light, the phase control unit comprises at least a plane waveguide and a plurality of circular, low refractive index regions provided within the plane waveguide and satisfying conditions i) to iii) as follows:

i): The plurality of circular, low refractive regions have a same curvature and different lengths.

ii): The plurality of circular, low refractive regions have convex portions of circular arcs oriented in a same direction and are sequentially arranged in a row in a length order along the direction.

iii): The plurality of circular, low refractive regions are arranged such that segments corresponding to tangent lines at endpoints of the regions, if extending outside the plurality of circular, low refractive index regions from both ends of the index regions, respectively, are converged into points on the both ends, respectively.

According to the optical circuit device of the present invention, the following functions can be obtained which will be described with reference to FIGS. 3(A) through 3(C).

FIG. 3(A) is a diagram for describing the state of guiding waves in the optical circuit device of the present invention. For brevity, FIG. 3(A) explicitly illustrates a part of a plane waveguide 51 and one low refractive index region $53_1$ among a plurality of circular, low refractive regions provided within the plane waveguide. FIG. 3(B) shows a refractive index distribution along the direction of radius R of the circular arc in the system shown in FIG. 3(A). FIG. 3(C) shows an equivalent refractive index field distribution in the system shown in FIG. 3(A) (which will be described later in detail).

In the system comprising the plane waveguide 51 and the circular, low refractive index region $53_1$, the Maxwell's equation can be expressed as follows, as disclosed in, for example, a reference 5 (Journal of Lightwave Technology, Vol. 11, November, 1993, p. 1737):

$$[\partial_2/\partial u^2 + \{k_0^2 n_t^2(u) - r_t^2\}]\phi_t(u) = 0$$

Where $u = R_t \ln(r/R_t)$, $R_t$ is a radius of the circular, low refractive index region, r is a position in the radius direction, $k_0 = 2\pi/\lambda$, $\lambda$ is the wavelength of waveguided light, $n_t(u) = n\{r(u)\} \cdot \exp(u/R_t)$ and $r(u) = R_t \cdot \exp(u/R_t)$. In addition, $\phi_t(u)$ indicates a light field distribution.

Here, if the radius $R_t$ is sufficiently large compared to the field distribution $(u/R_t \ll 1)$, the vicinity of the low refractive index region 53 (the vicinity of about a wavelength) can be approximated as $n_t(u) = n(R_t + u)(1 + u/R_t)$, as disclosed in the reference 5.

Since $n(R_t + u)$ is the original refractive index distribution, the equivalent refractive index distribution $n_t(u)$ eventually corresponds to a function of the original refractive index distribution $n(R_t+u)$ multiplied by a function $(1+u/R_t)$ increasing in the radius direction. This is typically illustrated by FIG. 3(C).

In the system consisting of the plane waveguide 51 and the circular, low refractive index region $53_1$, the inner edge (edge portion) 53a of the circular, low refractive index region $53_1$ has a waveguide structure. Due to this, light is propagated along the inner edge 53a of the circular, low refractive index region $53_1$. This state is illustrated as a light field distribution 55 in FIGS. 3(A) and 3(C).

As can be understood from the above, the present invention is not influenced by the concept of the width of a waveguide. As a result, no phase error resulting from a variation in the widths of waveguides occurs.

Furthermore, if using the fundamental mode in the above-stated waveguide structure generated on the inner edge (edge portion) 53a of the circular, low refractive index region $53_1$, it is obvious from the dispersion curve that the equivalent refractive index does not greatly vary while the refractive index distribution n varies. Due to this, even if the refractive index varies on the plane waveguide 51 or in the low refractive index region $53_1$, their equivalent refractive indexes do not change greatly. Therefore, even if a refractive index varies on the plane waveguides or in the low refractive index regions, phase errors hardly occur.

As can be seen from the above $n_t$'s equation, if the radius $R_t$ varies, $n_t$ varies, too. As a result, the equivalent refractive index of the waveguide structure varies. In case of the prior art disclosed in the above-mentioned Japanese Unexamined Patent Publication No. 6-194539, curved waveguides have different radiuses and, therefore, equivalent refractive indexes differ among the curved waveguides. On the other hand, according to the present invention, due to the fact that the radius $R_t$ is not changed, the equivalent refractive indexes of the waveguide structure are the same among the plurality of circular, low refractive index regions.

Moreover, since the plurality of low refractive index regions have different lengths, lights propagated through the plurality of low refractive index regions have a predetermined phase difference therebetween.

From the above facts, the present invention can realize an optical circuit device comprising a phase control unit capable of preventing a phase error from occurring, compared with the conventional case.

To carry out the present invention, it is preferable that mode converters for converting a waveguided light propagation mode from a propagation mode suited for the plane waveguide into a propagation mode suited for the phase control unit or vice versa are provided in the vicinity of the both ends of the plurality of circular, low refractive index regions, respectively.

By so doing, it is possible to convert light propagated through the plane waveguide into a propagation mode suited for the phase control unit and to convert light propagated through the phase control unit into a propagation mode suited for the plane waveguide. This makes it possible to propagate light effectively.

It is preferable that the mode converters are low refractive index regions (second low refractive index regions, see FIG. 6) having a plane shape where a width of the plane waveguide is narrowed as the plane waveguide is closer to the circular, low refractive index regions. By so doing, it is possible to collect light from the plane waveguide and to converge light up to a width equivalent to that of the field distribution 55 described with reference to FIG. 3. Therefore, light on the plane waveguide can be effectively input into the phase control unit. At the same time, the light propagated through the phase control unit, if output to the plane waveguide, can be returned to a spherical wave.

It is also preferable that each of the plurality of circular, low refractive index regions is obtained by removing a corresponding portion of the plane waveguide. By so doing, it is possible to easily fabricate the circular, low refractive index regions as well as the second low refractive index regions.

Furthermore, to carry out the present invention, input/output waveguide groups are provided within the plane waveguide. Each of the input/output waveguide groups consists of an input/output waveguide having an end portion positioned at a portion corresponding to the point into which the segments are converged and not less than one other input/output waveguides arranged with the input/output waveguide. If so, various functional devices such as a wavelength router and a demultiplexer can be realized.

BRIEF DESCRIPTION OF THE DRAWINGS

The foregoing and other objects, features and advantages of the present invention will be better understood from the following description taken in connection with the accompanying drawings, in which:

FIG. 3, including FIGS. 3(A)–3(C), is a view for describing the function and advantage of an optical circuit device according to the present invention.

DESCRIPTION OF THE PREFERRED EMBODIMENTS

Figure 1:
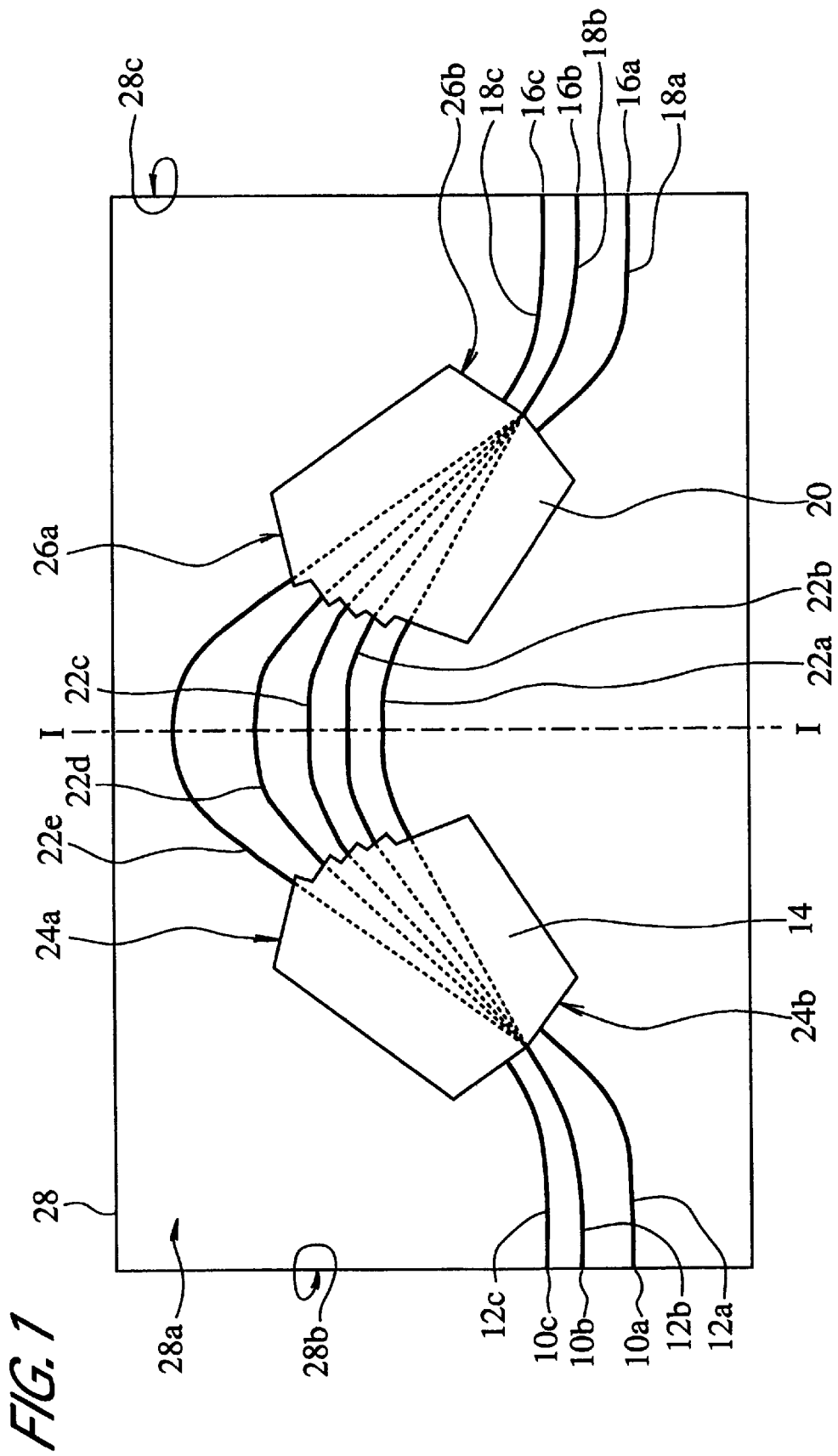
FIG. 1 is a view showing structure of an embodiment of a wavelength router according to the present invention.

With reference to the drawings, embodiments of the present invention will be described. It is noted that the drawings only show the structure, dimensions and configuration to such an extent that the present invention can be understood and that parameters such as numerical values are nothing more than an example. Therefore, the present invention should not be limited to the embodiments described hereinafter. It is also noted that the same elements are denoted by the same reference numerals throughout the drawings.

Embodiments of Wavelength Router

First, explanation will be given to the structure of one embodiment of a wavelength router according to the present invention. FIG. 1 is a plan view showing the structure of the wavelength router according the embodiment. The wavelength router comprises three input ports 10a, 10b and 10c, three input waveguides 12a, 12b and 12c each having one end connected to corresponding input ports, respectively, a first plane waveguide 14 to which the other ends of the input waveguides are connected. The wavelength router also comprises three output ports 16a, 16b and 16c, three output waveguides 18a, 18b and 18c each having one end connected to corresponding output ports, respectively, and a second plane waveguide 20 to which the other ends of the output waveguides are connected. The wavelength router further comprises five interconnecting waveguides 22a, 22b, 22c, 22d and 22e connecting an output end face 24a of the first plane waveguide 14 and an input end face 26a of the second plane waveguide 20.

These constitutional elements are formed on a substrate 28. The substrate 28 is made of, for example, electro-optical crystals. The substrate 28 has provided on its principal surface 28a the input waveguides 12a to 12c, the first plane waveguide 14, the interconnecting waveguides 22a to 22e, the second plane waveguide 20 and the output waveguide 18a to 18c. The input waveguides 12a to 12c, the first plane waveguide 14, the interconnecting waveguides 22a to 22e, the second plane waveguide 20 and the output waveguides 18a to 18c are made of a material such as, for example, quartz or ferroelectrics. The plane waveguides may be made of glass, compound semiconductors or polymers. The interconnecting waveguides 22a to 22e are arranged on the central portion of the substrate principal surface 28a. The first and second plane waveguides 14 and 20 are arranged such that the output end face 24a of the first plane waveguide 14 and the input end face 26a of the second plane waveguide 20 are coupled to the both ends of the respective interconnecting waveguides 22a to 22e and that the first and second plane waveguides 14 and 20 are symmetrical about a central line (I—I) of the substrate 28 in FIG. 1. The input waveguides 12a to 12c and the output waveguides 18a to 18c are arranged between the first plane waveguide 14 and one end face 28b of the substrate 28 and between the second plane waveguide 20 and the other end face 28c of the substrate 28, respectively so as to be symmetrical about the center line (I—I) of the substrate 28 in FIG. 1.

The three input ports 10a, 10b and 10c are arranged on the one end face 28b of the substrate 28. A waveguide array is formed by providing three input waveguides corresponding to the input ports 10a to 10c, that is, input waveguides 12a, 12b and 12c. One end of each of the input waveguides 12a, 12b and 12c is connected to a corresponding input port 10a, 10b and 10c, respectively. Other ends of the input waveguides 12a, 12b and 12c are connected to the other end face 24b of the first plane waveguide 14.

The three output ports 16a, 16b, 16c are arranged on the other end face 28c of the substrate 28. A waveguide array is formed by providing three output waveguides corresponding to the output ports 16a, 16b and 16c, that is, the output waveguides 18a, 18b and 18c. One end of each of the output waveguides 18a, 18b and 18c are connected to a corresponding output port 16a, 16b and 16c, respectively. Other ends of the output waveguides are connected to the other end face 26b of the second plane waveguide 20.

A waveguide array is formed by providing the desired number of interconnecting waveguides or, in this embodiment, five interconnecting waveguides 22a to 22e. One end of each of the respective interconnecting waveguides 22a to 22e is connected to the other output end face 24a of the first plane waveguide 14 and the other ends of the interconnecting waveguides 22a to 22e are connected to the other input end face 26a of the second plane waveguide 20.

To give different phases to light signals input from the input ports 10a to 10c and passing through the input waveguides 12a to 12c and the first plane waveguide 14, different optical path lengths are provided between the end face 24b and the output end face 24a of the first plane waveguide 14. The optical paths extend from first connection parts between the input waveguides 12a to 12c and the first plane waveguide 14, respectively, to first coupling parts between the interconnecting waveguides 22a to 22e and the first plane waveguide 14, respectively. To do this, in the wavelength router of this embodiment, lengths of the interconnecting waveguides 22a to 22e, that is, lengths of the light propagation paths or optical path lengths on the interconnecting waveguides 22a to 22e are set equal to one another. In addition, different optical path lengths are given from the first connection parts (end face 24b) into which light signals are input, to the first coupling parts (output end face 24a) between the first plane waveguide 14 and the interconnecting waveguides 22a to 22e from which the light signals are output, respectively. In other words, in this embodiment, light signals are provided with different phases not by making the lengths, that is, optical path lengths of the interconnecting waveguides 22a to 22e different but by making the lengths within the first plane waveguide 14 different. To be more specific, the light propagation paths from the first connection parts (end face 24b) to the first coupling parts (output end face 24a) have different optical path lengths to thereby give lights taking the respective propagation paths, different phases. Conversely, with such a structure, predetermined functions can be obtained even if the interconnecting waveguides have an equal length. Although FIG. 1 does not necessarily illustrate that the lengths (or optical path lengths) of the interconnecting waveguides 22a to 22e are equal, they are actually equal to one another. Since the interconnecting waveguides 22a to 22e are made of the same material, the equal light propagation path length leads to the equal optical path length.

Moreover, a diffraction grating structure is formed on the input end face 26a of the second plane waveguide 20 provided on the output side so as to be symmetrical to the output end face 24a of the first plane waveguide 14 about the line I—I. The second plane waveguide 20 mainly functions as an optical multiplexing device. Light signals passing through the interconnecting waveguides 22a to 22e, respectively and incident on the second plane waveguide 20 are given predetermined different phases. Due to this, the light signals interfere with one another and they are separated into predetermined output waveguides 18a to 18c, respectively. In this embodiment wherein the second plane waveguide 20 has a structure as mentioned above, the wavelength router also functions as a router even if light signals are input from the output ports 16a to 16c.

Figure 2:
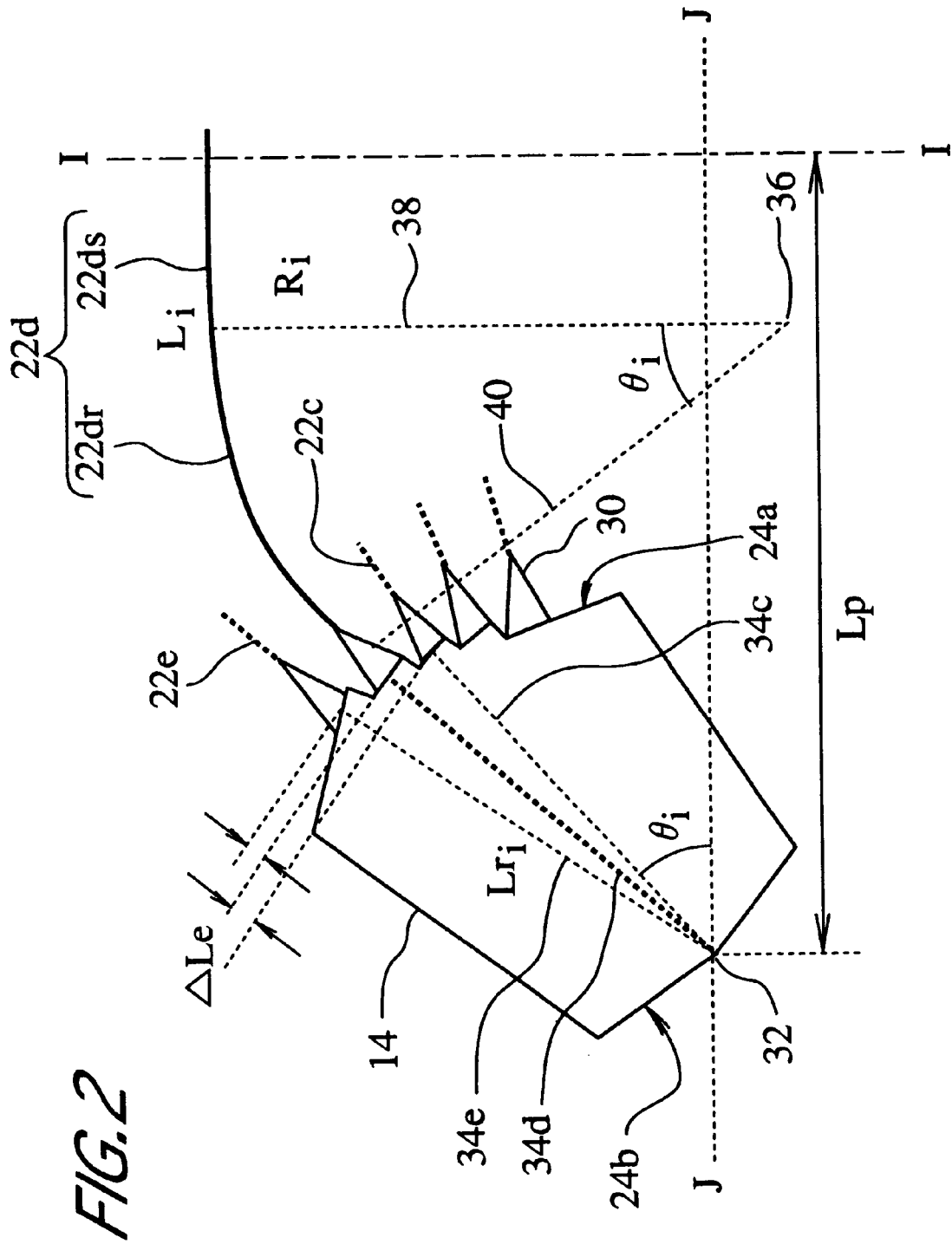
FIG. 2 is a view showing structure in the vicinity of a first plane waveguide of the wavelength router shown in FIG. 1.

The detailed structure of the first plane waveguide 14 will be described. FIG. 2 is a plan view showing an enlarged structure in the vicinity of the first plane waveguide 14. It is noted that FIG. 2 illustrates only part of the interconnecting waveguides 22a to 22e and does not illustrate the input waveguides 12a to 12c.

In the exemplary structure shown in FIG. 2, the output end face 24a and the end face 24b of the first plane waveguide 14 are curved to have convex surfaces. The output end face 24a of the first plane waveguide 14 is of a diffraction grating structure. In this case, the diffraction grating structure is formed by providing four grooves, extending in a direction perpendicular to the substrate principal surface 28a, on the output end face 24a. With these grooves, such a surface shape as stepped five gratings is formed on the output end face 24a.

The interconnecting waveguides 22a to 22e and the gratings formed on the output end face 24a are arranged such that directions in which the interconnecting waveguides 22a to 22e extend are almost perpendicular to the respective grating surfaces, that is, light signals are easily introduced into the interconnecting waveguides. One end of each of the interconnecting waveguides 22a to 22e is coupled to a stepped grating of the diffraction grating structure, respectively.

In this embodiment, tapers 30 are provided to the respective gratings of the output end face 24a. The tapers 30 have a shape of an unfolded fan spreading from one end of the interconnecting waveguides 22a to 22e to the output end face 24a. That is, the tapers 30 serve as plane waveguides having one end of the tapers 30 connected to the output end face 24a and having widths which are gradually narrowed as they are away from their respective connection parts. One end of each of the interconnecting waveguides 22a to 22e is connected to the other end of one of the tapers 30, respectively. In this way, the output end face 24a and one end of each of the interconnecting waveguides 22a to 22e are coupled through the taper structure. With such a structure, it is possible to make diameters of one ends of the interconnecting waveguides 22a to 22e connected to the output end face 24a of the first plane waveguide 14 larger than usual. This, in turn, makes it easy to introduce light signals propagated through the first plane waveguide 14 into the interconnecting waveguides 22a to 22e, respectively.

Next, an example of the design of the first plane waveguide 14 will be described. In the description, the first connection part between the input waveguide 12b and the end face 24b of the first plane waveguide 14 is defined as an outgoing point 32 from which a light signal is emitted into the first plane waveguide 14. A straight line connecting the outgoing point 32 and the first coupling part between the end face 24a of the first plane waveguide 14 and one end of the interconnecting waveguide 22d is defined as an optical path 34d. A straight line connecting the outgoing point 32 and the first coupling part between the output end face 24a of the first plane waveguide 14 and one end of the interconnecting waveguide 22c is defined as an optical path 34c. A straight line connecting the outgoing point 32 and the first coupling part between the output end face 24a of the first plane waveguide 14 and one end of the interconnecting waveguide 22e is defined as an optical path 34e. The interconnecting waveguides 22a to 22e are numbered 1 to 5, respectively.

In the wavelength router in this example, the i-th and (i+1)-th, optical path lengths are set such that the difference $(Lr_{i+1} - Lr_i)$ between an i-th optical path length $Lr_i$ and an (i+1)-th optical path length $Lr_{i+1}$ is constant, where i is an integer. The i-th optical path extends from the first connection part (outgoing point 32) between the input waveguide 12b and the first plane waveguide 14 to the coupling part between the first plane waveguide and an i-th interconnecting waveguide and the (i+1)-th optical path from the first connection part (outgoing point 32) to the first coupling part between the first plane waveguide 14 and an (i+1)-th interconnecting waveguide adjacent to the i-th interconnecting waveguide. For example, a third optical path length $Lr_3$ of the optical path 34c from the outgoing point 32 to the first coupling part between the first plane waveguide 14 and the third interconnecting waveguide 22c and a fourth optical path length $Lr_4$ of the optical path 34d from the outgoing point 32 to the first coupling part between the first plane waveguide 14 and the fourth interconnecting waveguide 22d are set such that the difference $(Lr_4 - Lr_3)$ between the optical path lengths $Lr_3$ and $Lr_4$ is a constant wavelength $\Delta Le$. Likewise, a fourth optical path length $Lr_4$ and a fifth optical path length $Lr_5$ of the optical path 34e from the outgoing point 32 to the first coupling part between the first plane waveguide 14 and the fifth interconnecting waveguide 22e are set such that the difference $(Lr_5 \div Lr_4)$ between the optical path lengths $Lr_4$ and $Lr_5$ is a constant wavelength $\Delta Le$.

The above example has illustrated the relationship between the optical path length from the first connection part between the input waveguide 12b and the first plane waveguide 14 to the first coupling part between the first plane waveguide 14 and each of the interconnecting waveguides 22a to 22e. The above-stated relationship can also be applied to the optical length from the first connection parts between the other input waveguide 12a or 12c and the first plane waveguide 14, respectively, to the first coupling part between the first plane waveguide 14 and each of the interconnecting waveguides 22a to 22e.

Furthermore, a length of the optical path from the outgoing point 32 to a point on the center line I—I on the i-th interconnecting waveguide is defined as an optical path length $L_i$. The difference $(L_i - Lr_i)$ is half the length of the i-th interconnecting waveguide (note, the optical path length is equivalent to the path length on the interconnecting waveguide). A straight line J—J on the substrate principal surface 28a perpendicular to the center line of the substrate principal surface 28a, that is, line I—I is set and the length of the optical path length $L_i$ projected onto the J—J line is defined as a projection length Lp. Here, the difference $(L_i - L_p)$ represents that if a light signal does not go straight on but curves, how excessively it goes, compared with a case it goes straight. The angle of the line J—J to the optical path from the outgoing point 32 to the first coupling part between the first plane waveguide 14 and the i-th interconnecting waveguide is defined as $\theta_i$. The difference $(\theta_{i+1} - \theta_i)$ is expressed as an angle $\Delta\theta_i$.

Each of the interconnecting waveguides 22a to 22e consists of a curved part and a straight part. The interconnecting waveguide 22d consists of, for example, a curved part 22dr and a straight part 22ds. Here, the bend radius of the curved part of the i-th interconnecting waveguide is defined as $R_i$. FIG. 2 illustrates a case where i=4. Then, the length of a segment 38 connecting a center 36 of the curved part 22dr of the interconnecting waveguide 22d and the connection part between the curved part 22dr and the straight part 22d corresponds to a bend radius $R_4$ and the direction in which the segment 38 extends is parallel to the direction in which the line I—I extends. The length of a segment 40 connecting the center 36 of the curved part 22dr and the first coupling part between the first plane waveguide 14 and the interconnecting waveguide 22dr is also equal to the bend radius $R_4$. The segment 38 has an angle $\theta_i$ or $\theta_4$ from the segment 40.

By setting the bend radius $R_i$, the interconnecting waveguides 22a to 22e are designed. Here, if the difference $(R_{i+1} - R_i)$ is defined as $\Delta R_i$, $\Delta R_i$ is expressed by using $Lr_i$, $\Delta Le$, $\theta_i$, $\Delta\theta_i$ and $R_i$ as a formula (1) as follows:

$$\Delta R_i = \frac{-\Delta L_e + \{(Lr_i + \Delta L_e/2)\sin[\theta_i + \Delta\theta_i/2] + R_i[1 - \cos[\theta_i + \Delta\theta_i/2]]\}\Delta\theta_i}{-(\theta_i + \Delta\theta_i/2) + \sin(\theta_i + \Delta\theta_i/2) + [\cos(\theta_i + \Delta\theta_i/2) - 1]\Delta\theta_i/2} \quad (1)$$

If, for example, the bend radius $R_1$ is appropriately set and thereafter $\Delta R_i$ is obtained from the formula (1), then the bend radius $R_2$ is determined from the relationship of $R_2=R_1+\Delta R_1$. The bend radius $R_i$ can be thus sequentially determined using the relationship of $R_{i+1}=R_i+\Delta R_i$ and the formula (1). In this case, the bend radius $R_i$ of each interconnecting waveguide is determined so that the length of the interconnecting waveguide, that is, the optical path length $2\times(L_i-Lr_i)$ is the same whatever the value i is.

If the interconnecting waveguides are designed as described above, the difference ($Lr_{i+1}-Lr_i$) between adjacent two optical path lengths within the first plane waveguide 14 can be a constant optical path length and the lengths of the interconnecting waveguides can be equal. If the angle $\theta_i$ increases, the optical path length $Lr_i$ within the first plane waveguide 14 becomes large and therefore the quantity of light of light signals reaching the i-th interconnecting waveguide decreases. However, in the case where the tapers 30 are provided, the width of the waveguide at the coupling part between the output end face 24a of the first plane waveguide 14 and the interconnecting waveguide is larger than usual. Due to this, light can be converged more easily. It is noted that all of the interconnecting waveguides and the first plane waveguide 14 are not necessarily coupled by the tapers 30. It is however preferable that, if the optical path length $Lr_i$ is relatively large, a taper 30 is provided between the corresponding interconnecting waveguide and the first plane waveguide 14.

A diffraction grating structure is provided to the input end face 26a of the output-side second plane waveguide 20 so as to be symmetrical to that of the output end face 24a of the first plane waveguide 14 about the line I—I. With such a structure, the router functions effectively as a wave composition device and also as a wave separation device when light signals are input from the output ports 16a to 16c.

The advantage of the wavelength router according to the embodiment will be described, while comparing it with the conventional case. In the conventional structure disclosed in the Reference 2 stated above, if the width W of the interconnecting waveguide is changed by $\Delta W$ due to a formation error or the like, the equivalent refractive index $n_e$ is changed by $\delta n_e$ as indicated by a formula (2) as follows:

$$\delta n_e = \frac{\partial n_e}{\partial W} \cdot \Delta W \qquad (2)$$

In that case, the wavelength characteristics $\lambda$ of light propagated through an interconnecting waveguide is changed by $\Delta\lambda$ as indicated by the following formula (3). The reference symbol $\lambda_0$ therein denotes a central wavelength:

$$\Delta\lambda = \lambda_0 \cdot \frac{\delta n_e}{n_e} \qquad (3)$$

Here, approximation as indicated by the following formula (4) is conducted. The reference symbol $\Delta n$ denotes the difference between the refractive index of the substrate and that of the waveguide.

$$\frac{\partial n_e}{\partial W}\Delta W \cong \Delta n \cdot \frac{\Delta W}{W} \qquad (4)$$

If the formula (4) is applied to the formula (3), $\Delta\lambda$ is expressed by the following formula (5). The reference symbol $\Delta$ denotes ($\Delta n/n_e$).

$$\Delta\lambda = \lambda_0 \frac{\Delta n}{n_e} \cdot \frac{\Delta W}{W} = \lambda_0 \Delta \cdot \frac{\Delta W}{W} \qquad (5)$$

Moreover, Reference 2 discloses the use of a waveguide having its strong confining character of $\Delta \cong 1\%$ as an interconnecting waveguide to make the curvature of the interconnecting waveguide smaller. In that case, ($\Delta W/W$)$\cong 2\%$ and ($\Delta\lambda/\lambda_0$)$\cong 2\times 10^{-4}$. In case of, for example, W=6 $\mu$m, it is necessary to form a waveguide width at an accuracy of 0.1 $\mu$m.

On the other hand, according to the wavelength router having the above-stated structure, light signals are not given different phases by making lengths of the interconnecting waveguides different and therefore the accuracy of the interconnecting waveguide width has nothing to do with the wavelength. Compared with the conventional structure disclosed in, for example, Reference 2, a wavelength router having a less wavelength shift can be obtained.

In the wavelength router according to the present invention, optical path lengths of a plurality of light propagation paths from the first connection parts to the first coupling parts between the first plane waveguide and the respective interconnecting waveguides differ from one another such that the lengths of the interconnecting waveguides are equal. Therefore, light signals incident on the first plane waveguide from the input waveguide through the first connection parts are diffracted at the first connection parts and diffused in many directions of the first plane waveguide. The diffused light signals are dispersed into and then reach many points on the output end face through respective light propagation paths within the first plane waveguide. One end of each of the plurality of interconnecting waveguides is coupled to a predetermined point on the output end face, respectively. The wavelength router according to the present invention has a structure in which the light signals incident from the input waveguides and reaching the interconnecting waveguides, respectively, are propagated through the different optical path lengths. Therefore, the light signals propagated through the first plane waveguide and reaching the different interconnecting waveguides have different phases, respectively. Due to this, desired functions can be obtained without making lengths of the interconnecting waveguides different as in the case of the conventional case. In addition, since the phase difference is not provided at the interconnecting waveguides, it is possible to realize a structure capable of preventing a wavelength shift resulting from the formation errors of the interconnecting waveguide widths.

In the wavelength router according to the present invention, the i-th and (i+1)-th optical path lengths are set such that the difference ($Lr_{i+1}-Lr_i$) between the i-th optical path length $Lr_i$ from the first connection part to the coupling part between the first plane waveguide and the i-th interconnecting waveguide and the optical path length $Lr_{i+1}$ from the first connection part to the first coupling part between the first plane waveguide and the (i+1)-th interconnecting waveguide adjacent to the i-th interconnecting waveguide is constant. With such a structure, it is possible to give predetermined different phases to light signals respectively incident on adjacent interconnecting waveguides on the output end face of the first plane waveguide.

The wavelength router according to the present invention advantageously has an output end face of a diffraction grating structure. By so doing, it is possible to make optical path lengths on the light propagation paths from the first connection parts between the input waveguide and the first plane waveguide to the output end face of the first plane waveguide different in accordance with the positions to which one end of each of the interconnecting waveguides is coupled, respectively. To carry out the wavelength router of the present invention, it is preferable that one end of each of the interconnecting waveguides is coupled to a stepped grating of the diffraction grating structure, respectively.

Moreover, in the waveguide router according to the present invention, the output end face and one end of each of the interconnecting waveguides are coupled through the taper structure. With such a structure, diameters of one end of each of the interconnecting waveguides connected to the output end face of the first plane waveguide are larger than usual and the ratio at which the light signals propagated through the first plane waveguide are incident on the respective interconnecting waveguides is increased. Therefore, light signals can be effectively converged into the respective interconnecting waveguides. As a result, even if the optical path length from the first connection parts between the input waveguide and the first plane waveguide to the coupling parts between the interconnecting waveguides and the first plane waveguide are relatively long, it is possible to prevent the quantity of light of the light signals incident on the interconnecting waveguides from decreasing. To carry out the wavelength router according to the present invention, it is preferable that the taper structure is in the shape of unfolded fan from one end of each of the interconnecting waveguides to the output end face.

It should be noted that the first and second plane waveguides 14, 20 as described above may be replaced by a plane waveguide to be described later (denoted by reference numeral 51 in FIG. 4).

Embodiments of Optical Circuit Devices

Figure 4:
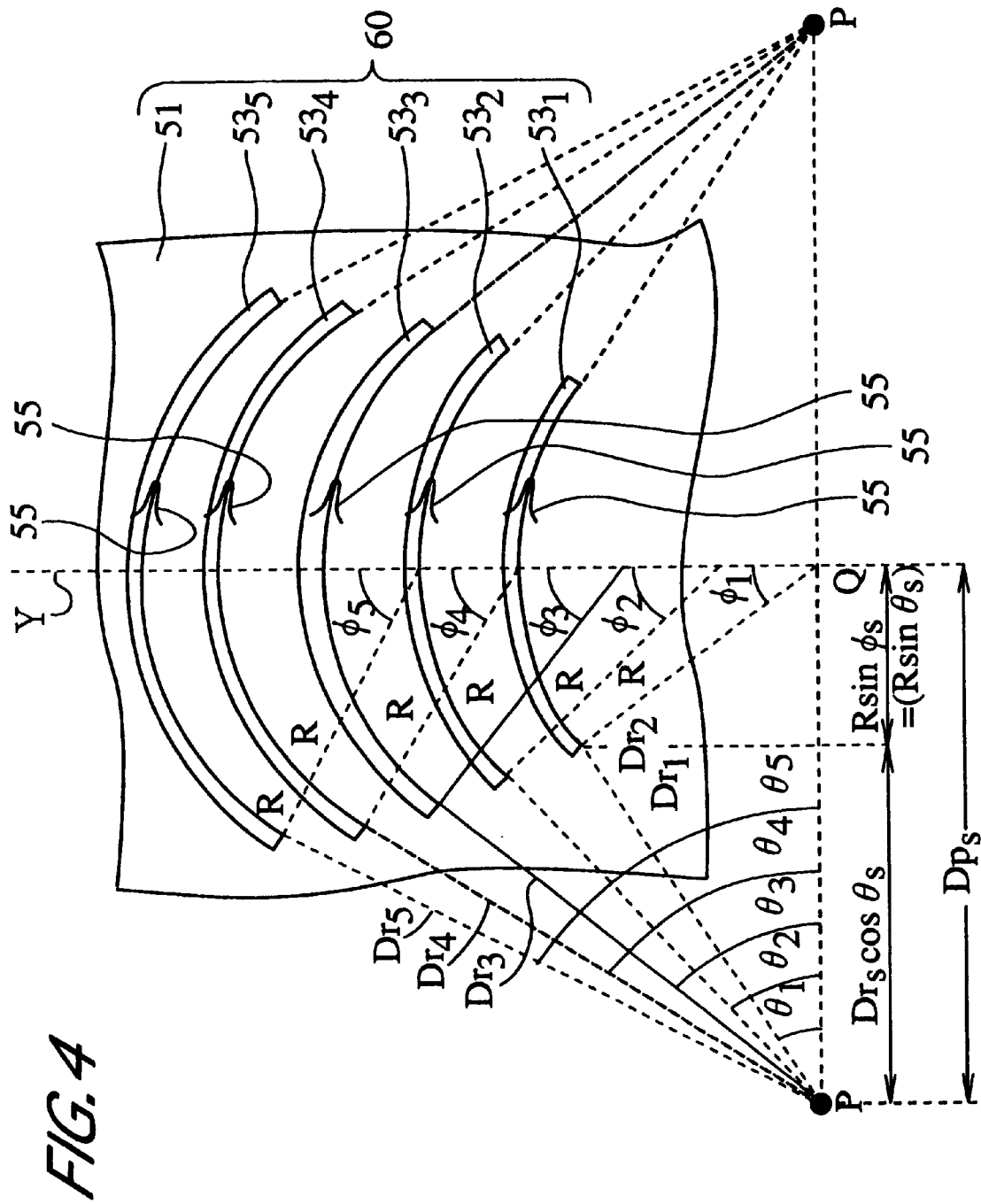
FIG. 4 is a view for describing an example of a structure of the optical circuit device according to the present invention and particularly describing the basic structure thereof.
Figure 5:
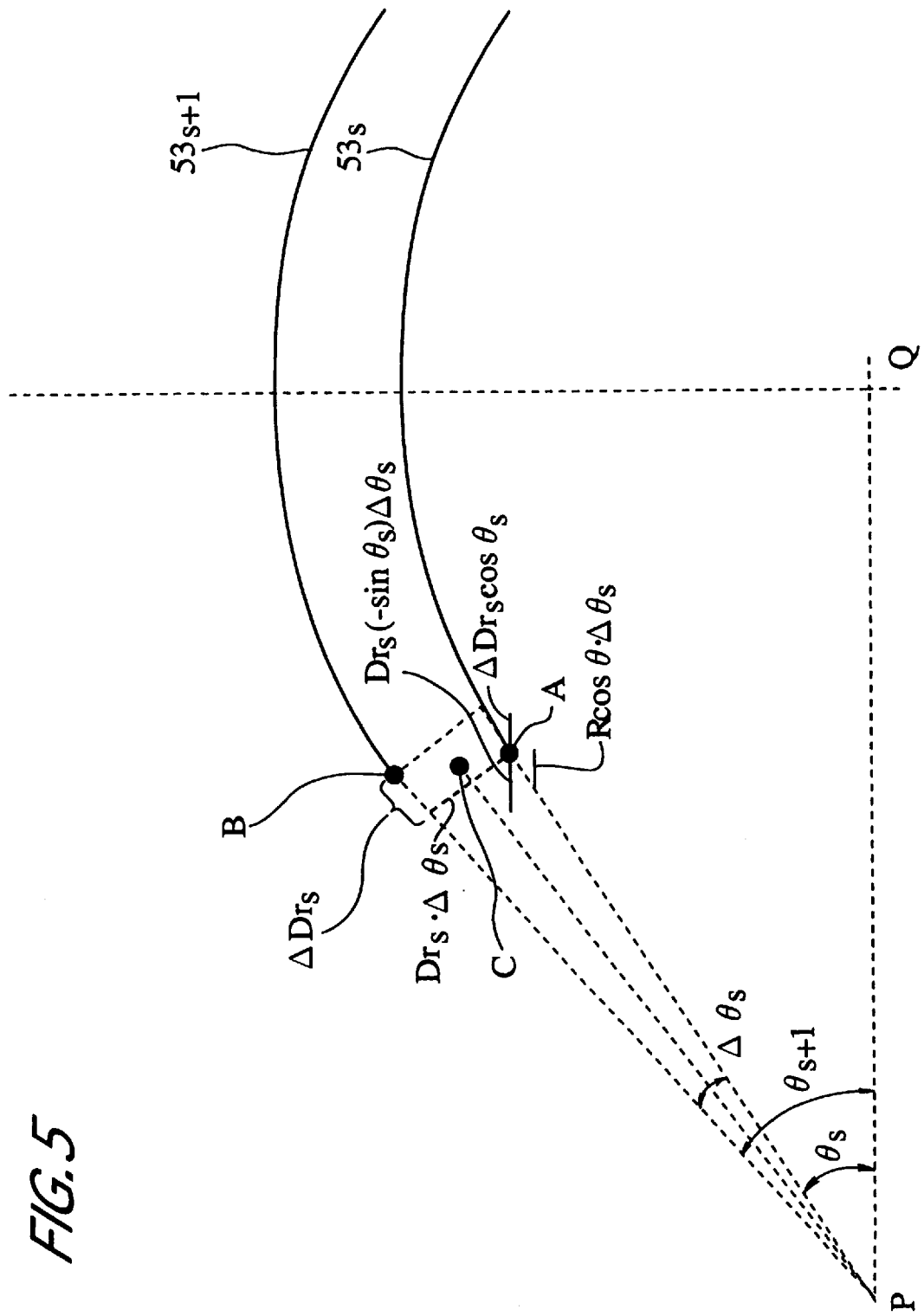
FIG. 5 is a view for describing an example of a structure of the optical circuit device according to the present invention and particularly describing the formation method (design method) in detail.

FIG. 4 is a plan view showing the basic structure of the optical circuit device (first embodiment) according to the present invention.

The optical circuit device according to the present invention comprises a phase control unit 60 comprising a plane waveguide 51 and a plurality of circular, low refractive index regions $53_1$ to $53_5$ provided in the plane waveguide 51 and satisfying conditions i) to iii) described later. The number of the circular, low refractive index regions should not be limited to the example of FIG. 4. Here, the circular, low refractive index region is also called as a first region.

The plane waveguide 51 is formed by a material capable of waveguiding light such as, for example, film formed on a substrate or other underlying layer. The substrate and film are made of freely chosen, desired glass, compound semiconductors, polymers, quartz, dielectrics and the like.

The low refractive index regions $53_1$ to $53_5$ are regions having lower refractive indexes than that of the plane waveguide 51. It is easy to make those regions using, for example, predetermined parts removed from the plane waveguide 51. Air layers after removal become low refractive index regions. Needless to say, the low refractive index regions may be made of material having a lower refractive index than that of the peripheral material. For example, if the plane waveguide is made of InGaAsP, the low refractive index regions can be made of InP.

Furthermore, i): the plurality of circular, low refractive index regions $53_1$ to $53_5$ have the same curvature but different lengths. ii): Convex sides of the circular arcs of the circular, low refractive index regions $53_1$ to $53_5$ are oriented in the same direction (downward to upward directions in FIG. 4) and the regions are arranged according to the lengths in the order of smaller to larger lengths in the direction, that is, the regions $53_1$ to $53_5$ in FIG. 4. iii): The plurality of circular, low refractive index regions $53_1$ to $53_5$ are arranged within the plane waveguide 51 such that if segments $Dr_1$ to $Dr_5$ corresponding to tangent lines at endpoints extend outside the regions from both ends of the regions $53_1$ to $53_5$, points P into which the segments $Dr_1$ to $Dr_5$ are converged are generated on the both sides, respectively (the way to arrange the regions will be described later).

The segments $Dr_1$ to $Dr_5$ correspond to optical paths from points P to the plurality of circular, low refractive index regions $53_1$ to $53_5$, respectively.

The phase control unit 60 as stated above has waveguide structures along the inner edges of the circular, low refractive index regions $53_1$ to $53_5$ as described with reference to FIG. 1. Optical path lengths are different according to optical paths passing from the point P through the circular, low refractive index regions $53_1$ to $53_5$. As a result, lights propagated through the low refractive index regions $53_1$ to $53_5$ have phases different from one another. Thus, the phase control unit is obtained.

Next, an example of a method for forming the phase control unit 60 according to the present invention will be described. It is noted that in the description, the above-mentioned segments $Dr_1$ to $Dr_5$ might be expressed as a representative segment $Dr_S$ and the circular, low refractive index regions $53_1$ to $53_5$ might be expressed as a representative region $53_S$, where S denotes a numerical value not less than 1 in the low refractive index regions (which is applied to the following description).

In the structure shown in FIG. 4, the sum of the segment $Dr_S$ and half the length of the circular, low refractive index region $53_S$ corresponding to the segment $Dr_S$ is expressed as $D_S$. Namely, the length of the waveguide from the point P through the segment $Dr_S$ to a central position of the circular, low refractive index region $53_S$ (a position intersecting a center line Y in FIG. 4) is expressed as $D_S$. Additionally, the length obtained when the length of the waveguide $D_S$ is projected onto a segment PQ (to be also referred to as a reference line PQ) connecting the center of curvature Q of the shortest circular, low refractive index region $53_1$ and the point P is expressed as $DP_S$.

Here, half the length of the circular, low refractive index region $53_S$ can be expressed as $2\pi R_S \cdot \phi_S / 2\pi = R_S \cdot \phi_S$ and $D_S$ can be also expressed as $D_S = Dr_S + R_S \phi_S$.

The symbol $\phi_S$ can be a freely defined value according to the design. In this case, $\phi_S = \theta_S$, where $\theta_S$ is an angle of the reference line PQ to the segment $Lr_S$.

If $\phi_S$ is defined as $\phi_S = \theta_S$, it is possible to prevent a loss caused by distributing light from, for example, the point P to the regions $53_1$ to $53_5$, compared with a case where $\phi_S$ is defined otherwise.

A radius $R_S$ of the circular, low refractive index region $53_S$ is a constant R. Thus, $D_S$ can be also expressed as $D_S = Dr_S + R\theta_S$.

Then, if the difference between adjacent two $L_S$ is $\Delta D_S$, the $\Delta D_S$ is expressed as follows:

$$\Delta D_S = (Dr_{S+1} + R\theta_{S+1}) - (Dr_S + R\theta_S)$$

$$= Dr_{S+1} - Dr_S + R\theta_{S+1} - R\theta_S$$

$$= \Delta Dr_S + R\Delta\theta_S \quad (a)$$

In the formula (a), $\Delta Dr_S = Dr_{S+1} - Dr_S$ and $\Delta\theta_S = \theta_{S+1} - \theta_S$.

If $\Delta D_S$ is replaced by $\Delta Def$, the formula (a) is expressed as the following formula (b), where $\Delta Def$ is the difference between optical path lengths for obtaining a desired phase difference at $L_S$.

$$\Delta Def = \Delta Dr_S + R\Delta\theta_S \quad (b)$$

On the other hand, $Dp_S$ can be expressed as $Dp_S=Dr_S\cos\theta_S+R\sin\phi_S$ (see FIG. 2). As already mentioned above, since $\phi_S$ is set as $\phi_S=\theta_S$, $Dp_S$ can be expressed as $Dp_S=Dr_S\cos\theta_S+R\sin\theta_S$.

Moreover, if the difference between two adjacent $Dp_S$ is $\Delta Dp_S$, $\Delta Dp_S$ is expressed as the following formula (c):

$$\Delta Dp_S = \Delta Dr_S \cdot \cos\theta_S + Dr_S \cdot (-\sin\theta_S) \cdot \Delta\theta_S + R \cdot \cos\theta_S \cdot \Delta\theta_S \quad (c)$$

In the formula (c), $\Delta Dr_S \cdot \cos\theta_S$, $Dr_S (-\sin\theta_S) \cdot \Delta\theta_S$ and $R \cdot \cos\theta_S \cdot \Delta\theta_S$ denote values of respective parts shown in FIG. 3.

Meanwhile, $Dp_S$ is obtained by projecting $D_S$ onto the reference line PQ and therefore $\Delta Dp_S=0$. Accordingly, the formula (c) can be rewritten into the following formula (d):

$$\Delta Dr_S \cdot \cos\theta_S + (R \cdot \cos\theta_S - Dr_S \cdot \sin\theta_S) \cdot \Delta\theta_S = 0 \quad (d)$$

Next, the formula (b) is modified into $\Delta Dr_S = \Delta Def - R\Delta\theta_S$ and the modified formula is substituted for $\Delta Dr_S$ in the formula (d). Then, the following formula (e) is obtained:

$$(\Delta Def - R\Delta\theta_S) \cdot \cos\theta_S + (R \cdot \cos\theta_S - Dr_S \cdot \sin\theta_S) \cdot \Delta\theta_S = 0 \quad (e)$$

The formula (e) is also rewritten as follows:

$$(\Delta Def \cdot \cos\theta_S - R\Delta\theta_S \cdot \cos\theta_S + R\Delta\theta_S \cdot \cos\theta_S - Dr_S \sin\theta_S \cdot \Delta\theta_S = 0$$

By further modifying the above formula, a formula (f) is obtained as follows:

$$\Delta Def \cdot \cos\theta_S - Dr_S \cdot \sin\theta_S \cdot \Delta\theta_S = 0 \quad (f)$$

$\Delta\theta_S$ is obtained according to the formula (f) as follows:

$$\Delta\theta_S = \Delta Def \cdot \cos\theta_S / Dr_S \cdot \sin\theta_S \quad (g)$$

To accurately calculate $\Delta\theta_S$, it is preferable that $(Dr_{S+1}+Dr_S)/2 = Dr_S + \Delta Dr_S/2$ is substituted for $Dr_S$ and $(\theta_{S+1}+\theta_S)/2 = \theta_S + \Delta\theta_S/2$ is substituted for $\theta_S$. The reasons is that if a point B is obtained based on a point A, a calculation accuracy for obtaining $\Delta\theta_S$ is increased by using an intermediate point C between the point A and the point B instead of a value based on the point A as shown in FIG. 3.

The values $\Delta Dr_S$ and $\Delta\theta_S$ are however, yet to be obtained. Therefore, $\Delta Dr_{S-1}$ and $\Delta\theta_{S-1}$ are used instead of $\Delta Dr_S$ and $\Delta\theta_S$, respectively.

Then, the above formula (g) can be rewritten into formula (6) as follows:

$$\Delta\theta_S = \Delta Def \cdot \cos\theta \cdot (\theta_S + \Delta\theta_{S-1}/2)/(Dr_S + \Delta Dr_{S-1}/2) \cdot \sin(\theta_S + \Delta\theta_{S-1}/2) \quad (6)$$

$\Delta Dr_S$ is obtained from the formula (b) as expressed by the following formula (7):

$$\Delta Dr_S = -R \cdot \Delta\theta_S + \Delta Def \quad (7)$$

Then, $Dr_{S+1}$ and $\theta_{S+1}$ can be obtained from the following formulas (8) and (9):

$$Dr_{S+1} = Dr_S + \Delta Dr_S \quad (8)$$

$$\theta_{S+1} = \theta_S + \Delta\theta_S \quad (9)$$

Following the formulas (6) to (9), $Dr_1$ to $Dr_5$ and $\theta_1$ to $\theta_5$ shown in FIG. 4 are obtained as described below.

First, as initial values, $\theta_1$, $\Delta\theta_0$, $Dr_1$ and $\Delta Dr_0$ are to be determined. Here, $\Delta Dr_0 = -R \cdot \Delta\theta_0 + \Delta Def$ from the formula (7). $\Delta\theta_0$ is defined as a value obtained as $\Delta\theta_0=$(Diffraction angle of input waveguide)/(Number of low refractive index regions $53_S$). In connection with the input/output waveguide groups (see, for example, FIG. 6) consisting of, for example, input/output waveguides provided at the points P and not less than one other input/output waveguides parallel to those provided at the points P, following parameters (i), (ii) and (iii) are considered. That is, (i) Waveguide spacing distance; (ii) Number of waveguides; and (iii) Diffraction angle of an array consisting of low refractive index regions $53_S$. In this case, Dr, is defined as a value obtained as $Dr_1=$(Waveguide spacing distance)×(Number of waveguides)/(Diffraction angle of an array consisting of low refractive index regions $53_S$).

The initial values $\theta_1$, $\Delta\theta_0$, $Dr_1$ and $\Delta Dr_0$ thus determined are substituted for $\theta_S$, $\Delta\theta_{S-1}$, $Dr_S$, $\Delta Dr_{S-1}$ in the formula (6) and $\Delta\theta_1$ is obtained. The thus obtained $\Delta\theta_1$ is substituted for $\Delta\theta_S$ in the formula (7) and $\Delta Dr_1$ is obtained. Next, $Dr_2$ is obtained from the formula (3) and $\theta_2$ is obtained from the formula (4).

These $\theta_2$, $\Delta\theta_1$, $Dr_2$ and $\Delta Dr_1$ are substituted for $\theta_S$, $\Delta\theta_{S-1}$, $Dr_S$, $\Delta Dr_{S-1}$ in the formula (6) and $\Delta\theta_2$ is obtained. The same process is repeated until S becomes the number of the low refractive index regions. Thereby, $Dr_1$ to $Dr_5$ and $\theta_1$ to $\theta_5$ can be obtained.

Now, by changing the initial value of $\theta_1$, the same process is repeated and $\theta_1$ at which $Dp_S$ (see FIG. 4) becomes a minimum or the length of the optical circuit device becomes a minimum is found. Based on the $Dr_S$ and $\theta_S$ sequentially obtained by the above-stated process based on $\theta_1$ at which $Dp_S$ (see FIG. 4) becomes a minimum or the length of the optical circuit device becomes a minimum, the optical circuit device is constructed.

Figure 6A:
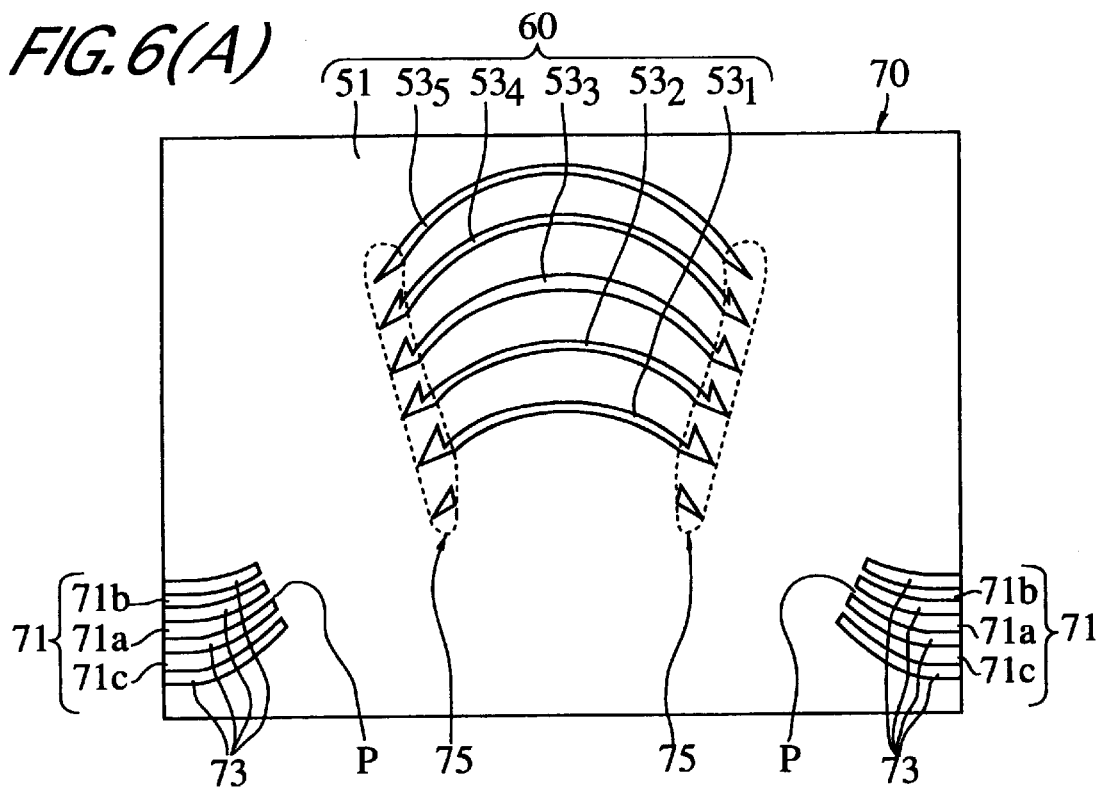
FIG. 6 is a view for describing an example of another structure of the optical circuit device according to the present invention and particularly describing an example of an applied wavelength router.

Next, description will be given to an embodiment of applying the optical circuit device according to the present invention to a wavelength router. FIG. 6(A) is a plan view for describing the wavelength router 30.

The wavelength router has a phase control unit 60 described in the embodiment of the optical circuit device, provided on the plane waveguide 51. An input/output waveguide group 71 consisting of an input/output waveguide 71a having one end positioned at a portion corresponding to the point P, and not less than one other input/output waveguide 71b, 71c (two paths in FIG. 6), is provided on the plane waveguide 51. The input/output waveguide group 71 is provided on both sides of the phase control unit 60.

Each of the input/output waveguide group 71 has a structure in which the input/output waveguide 71a is put between the input/output waveguides 71b and 71c. Needless to say, the number of the input/output waveguides constituting the input/output waveguide group 71 should not be limited to three.

The input/output waveguides 71a to 71c can be formed out of band-shaped portions of the plane waveguide 51. That is, as shown in FIG. 6(A), to make band-shaped portions of the plane waveguide 51 remain, portions of the plane waveguide 51 on both sides of the planned band-shaped portion formation regions are removed by a certain depth and the concave portions 73 are formed within the plane waveguide 51. The remaining portions of the plane waveguide put between the concave portions 73 serve as input/output waveguides.

Further, the optical circuit device (or wavelength router) 70 has mode converters 75 for converting a mode of the waveguided light propagated through the plane waveguide 51 into a mode of the waveguided light propagated through the phase control unit 70, provided in the vicinity of both ends of the circular, low refractive index regions $53_1$ to $53_5$, respectively or vice versa.

Figure 6B:
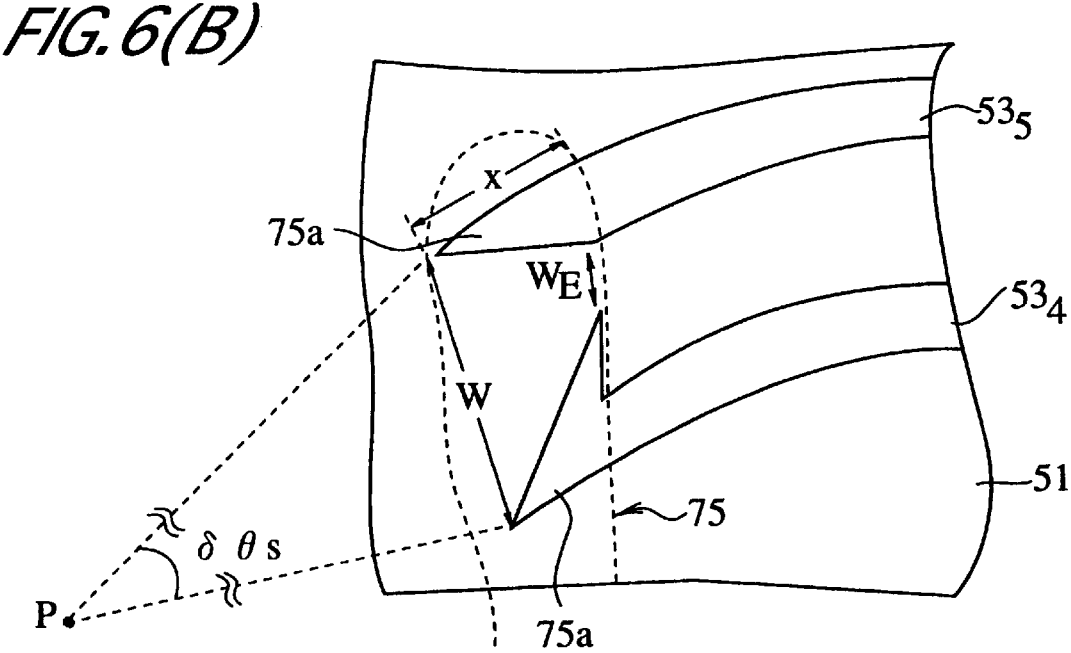

The mode converter 75 will be described in detail with reference to FIG. 6(B). FIG. 6(B) is an enlarged view where the vicinity of end portions of the circular, low refractive index regions $53_4$ and $53_5$ of FIG. 6(A) are explicitly illustrated.

The mode converter 75 comprises a low refractive index region where the width of the plane waveguide is gradually narrower as it is closer to the circular, low refractive index regions $53_4$ and $53_5$ or, that is, consists of a low refractive index region (second low refractive index region) where the width of the plane waveguide is tapered. The second low refractive index region 75a can be made out of, for example, portions obtained by removing corresponding portions of the plane waveguide 51.

When considering an angle obtained as $\delta\theta_S=[(\theta_S-\theta_{S-1})+(\theta/_{S+1}-\theta_S)]/2$ from the point P, it is preferable to provide second low refractive index regions 75a such that the distance W between tip ends of the adjacent two, second low refractive index regions 75a or, that is, the width W of the portions of the plane waveguide on the tip ends becomes a value expressed as $W=0.7\times\delta\theta_S\times Dr_S$ or that close to the value. The reason is that this make it possible to effectively makes conversion. Although not limited to the above, the distance $W_E$ between the adjacent two, second low refractive index regions 75a can be set, for example, to 10 μm.

A length x in the waveguide direction of the second low refractive index region 75a (see FIG. 6(B)) can be short such as about hundreds of microns. With such a length, a phase error at the mode converter is negligible. In addition, the second low refractive index region 75a can be integrally formed with the circular, low refractive index region $53_S$.

The wavelength router 70 can be utilized, for example, as follows. The light input into and passed through the input/output waveguide 71a from the input port is emitted into the plane waveguide 51 (FIGS. 6(A), 6(B)). The emitted light is a spherical wave. The spherical wave is converted into a mode propagated along the inner edge of the low refractive index region described with reference to FIG. 3 by a mode converter 75. That is, the spherical wave is converged into the tapered, second low refractive index region 75a and narrowed to a width equal to that of a field distribution described with reference to FIG. 3. Thereafter, the spherical wave enters the phase control unit 60 (FIGS. 6(A) and 6(B)).

The equiphase wave surface of the light which has entered the phase control unit 60 is controlled by the phase control unit 60. After the light is returned to a spherical wave by the mode converter 75 at the outlet of the phase control unit 60, the light interferes with the other input/output waveguide group 71 to thereby generate high power density light on the input/output waveguide group 71. The high power density light is output to one of the input/output waveguides 7 1a to 71c.

If light having multiple wavelengths is input into the input/output waveguide 71a of one input/output waveguide group 71, for example, predetermined one or plural wavelength lights are output from one of the waveguide of the other input/output waveguide group 71 and another predetermined one or plural wavelength lights are output from another waveguide. The specific example of such a wavelength router will be described below.

The wavelength router described with reference to FIG. 6(A) has 16 circular, low refractive index regions and input/output waveguide groups consisting of input/output waveguides which number is increased. When designing the wavelength router, $\theta_1=1$ rad, $\Delta\theta_0=0.01$ rad, $Dr_S=1500$ μm, $R=250$ μm, $\Delta Def=20$ μm are substituted for $\theta_S$, $\Delta\theta_S$, $Dr_S$, R and $\Delta Def$ in the formulas (6) and (7).

A simulation (Experiment I) was conducted. That is, it was simulated what type of wavelength of light is output from a waveguide positioned in the center of the other input/output waveguide group 71 if light of wavelengths from 1.53 to 1.56 μm is input from a waveguide positioned in the center of one input/output waveguide group 71 (a waveguide at a position corresponding to the point P). Another simulation (Experiment II) was also conducted as follows. That is, it was simulated what type of wavelength of light is output from a waveguide shifted by two from that positioned in the center of the other input/output waveguide group 71 in the upward direction of FIG. 6(A) if light of wavelengths from 1.53 to 1.56 μm is input from a waveguide shifted by one from that positioned in the center of the one input/output waveguide group 71 in the downward direction of FIG. 6(A).

In the above-stated simulations, lights on all the paths from the waveguides inputting the lights through the plane waveguide 51 and the phase control unit 60 to the monitoring targets, that is, output waveguides were added while considering light intensities and phases at the output waveguides or the monitoring targets.

Figure 7:
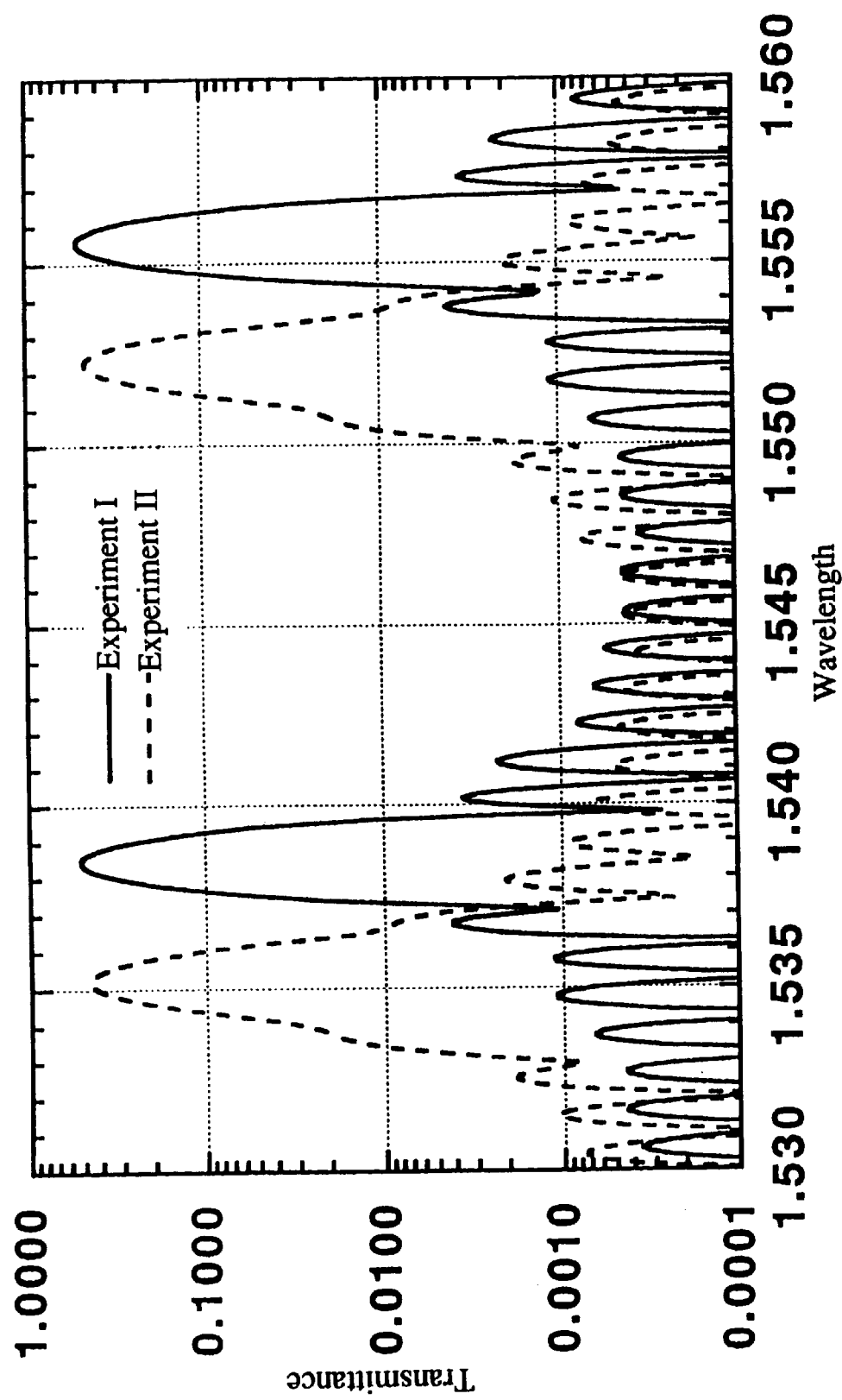
FIG. 7 is an explanatory view for the result of simulating the characteristics of the wavelength router using the optical circuit device according to the present invention.

Wavelength refractive index characteristics obtained by the simulations in the Experiments I and II are illustrated by FIG. 7. In FIG. 7, the axis of abscissas denotes a wavelength and the axis of ordinates denotes a transmittance. The result of the Experiment I is indicated by a solid line and that of the Experiment II is indicated by a broken line.

Based upon FIG. 7, the wavelength router in this case selectively routes two kinds of wavelength lights to one output waveguide. In case of the Experiment I, a first light in the vicinity of a wavelength of 1.538 and a second light in the vicinity of a wavelength of 1.555 are selectively routed. In case of the Experiment II, a first light in the vicinity of a wavelength of 1.535 and a second light in the vicinity of a wavelength of 1.552 are selectively routed.

As is obvious from the above description, in the optical circuit device having a phase control unit for controlling the phase of waveguided light according to present invention, the phase control unit comprises at least a plane waveguide and a plurality of circular, low refractive index regions provided in the plane waveguide and satisfying the above-stated conditions i) to iii).

Owing to this, light is propagated along the inner edges (edge portions) of the circular, low refractive index regions and therefore no phase errors resulting from a variation in widths of the waveguides occur.

Furthermore, a variation in equivalent refractive index is small since the fundamental mode of the above-mentioned waveguide structure provided at the inner edges (edge portions) of the circular, low refractive index regions can be made use of. Thus, even if refractive indexes change on the plane waveguide or in the low refractive index regions, phase errors can be prevented from occurring.

Moreover, since the plurality of circular, low refractive index regions have the same radius R, a variation in equivalent refractive index resulting from a radius change does not occur.

In addition, the plurality of low refractive index regions differ in length from one another. This makes it possible to give predetermined different phases to lights propagating through the plural low refractive index regions.

Accordingly, the present invention realizes an optical circuit device capable of preventing phase errors, compared with the conventional device.

What is claimed is:

1. A wavelength router comprising:

a plurality of input ports for inputting light signals;

a plurality of input waveguides each having one end connected to a corresponding one of said input ports, respectively;

a first plane waveguide connected to other ends of said input waveguides at respective first connection parts, said first plane waveguide having an output end face;

a plurality of output ports for outputting light signals;

a plurality of output waveguides each having one end connected to a corresponding one of said output ports, respectively;

a second plane waveguide connected to other ends of said output waveguides, said second plane waveguide having an input end face;

a plurality of interconnecting waveguides connecting said output end face of said first plane waveguide and said input end face of said second plane waveguide, said interconnecting waveguides having respective lengths equal to one another;

wherein optical path lengths of a plurality of light propagation paths from said first connection parts between said input waveguides and said first plane waveguide, respectively, to second connection parts between said interconnecting waveguides and said second plane waveguide, respectively, differ from one another so as to provide different phases to the light signals.

2. A wavelength router according to claim 1, wherein an i-th optical path length $Lr_i$ from a first connection part among said first connection parts to a first coupling part between said first plane waveguide and an i-th interconnecting waveguide where i is an integer, of said interconnecting waveguides, and an (i+1)-th optical path length $Lr_{i+1}$ from a first connection part among said first connection parts to a first coupling part between said first plane waveguide and an (i+1)-th interconnecting waveguide adjacent to said i-th interconnecting waveguide are set such that a difference $(Lr_{i+1}-Lr_i)$ between said i-th and (i+1)-th optical path lengths is constant.

3. A wavelength router according to claim 1, wherein said output end face of said first plane waveguide is of a diffraction grating structure.

4. A wavelength router according to claim 3, wherein one ends of said interconnecting waveguides are connected to stepped gratings provided at said diffraction grating structure, respectively.

5. A wavelength router according to claim 1, wherein said output end face and one ends of said interconnecting waveguides are coupled through a taper structure.

6. A waveguide router according to claim 5, wherein said taper structure has a shape of an unfolded fan from the one ends of said interconnecting waveguides to said output end face.

7. A waveguide router according to claim 1, wherein said interconnecting waveguides have curved line portions and straight line portions close to a center line on said first plane waveguide side and curved line portions and straight line portions close to the center line on said second plane waveguide side, respectively, said first plane waveguide side curved line portions and straight line portions being symmetrical to said second plane waveguide side curved line portions and straight line portions about the center line, respectively; and if an i-th optical path length from a first connection part between said input waveguide and said first plane waveguide to an i-th coupling part of said interconnecting waveguides is defined as $L_i$, and optical paths from said first connection parts to points (central point) having half lengths of those of said interconnecting waveguides are defined as $Lr_i$, where i is an integer, then bend radiuses $R_i$ of said curved portions are determined such that the lengths of said interconnecting waveguide $2\times(L_i-Lr_i)$ become constant regardless of said value i.

* * * * *